United States Patent
Sung et al.

(10) Patent No.: US 8,045,577 B2
(45) Date of Patent: Oct. 25, 2011

(54) METHOD AND APPARATUS FOR ALLOCATING WIRELESS RESOURCE AND WIRELESS NETWORK SYSTEM

(75) Inventors: Jung-sik Sung, Daejeon-si (KR); Jae-doo Huh, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 46 days.

(21) Appl. No.: 12/497,789

(22) Filed: Jul. 6, 2009

(65) Prior Publication Data

US 2010/0098106 A1    Apr. 22, 2010

(30) Foreign Application Priority Data

Oct. 22, 2008 (KR) .................. 10-2008-0103643

(51) Int. Cl.
*H04L 12/43* (2006.01)
*H04L 12/26* (2006.01)
*H04W 4/00* (2009.01)

(52) U.S. Cl. ......... 370/461; 370/447; 370/252; 370/338

(58) Field of Classification Search .................. 370/461, 370/328, 329, 447, 338, 462, 252; 455/452.1
See application file for complete search history.

(56) References Cited

U.S. PATENT DOCUMENTS

| | | | |
|---|---|---|---|
| 7,424,001 B2 | 9/2008 | Kim et al. | |
| 7,912,081 B2 | 3/2011 | Heidari-Bateni et al. | |
| 2005/0243794 A1 | 11/2005 | Yoon et al. | |
| 2005/0249170 A1 | 11/2005 | Salokannel et al. | |
| 2005/0249173 A1* | 11/2005 | Salokannel et al. | 370/338 |
| 2006/0077930 A1* | 4/2006 | Kim et al. | 370/329 |
| 2006/0133403 A1 | 6/2006 | Chun et al. | |
| 2007/0039006 A1 | 2/2007 | Krammer et al. | |
| 2008/0130567 A1 | 6/2008 | Jeon et al. | |
| 2008/0137600 A1* | 6/2008 | Jeon et al. | 370/329 |
| 2008/0144597 A1* | 6/2008 | Chen | 370/345 |
| 2008/0247376 A1* | 10/2008 | Del Prado Pavon et al. | 370/345 |
| 2008/0259895 A1* | 10/2008 | Habetha et al. | 370/345 |

(Continued)

FOREIGN PATENT DOCUMENTS

KR    2002-0056047    7/2002

(Continued)

OTHER PUBLICATIONS

U.S. Appl. No. 11/952,195, filed Dec. 7, 2007, Alex Skripnikov et al.

(Continued)

*Primary Examiner* — Kwang B Yao
*Assistant Examiner* — Candal Elpenord
(74) *Attorney, Agent, or Firm* — Staas & Halsey LLP

(57) ABSTRACT

A wireless resource allocation apparatus and method which maintain quality of service (QoS) in a wireless communication network are provided. The wireless resource allocation method includes calculating the number of medium access slots (MAS) to be allocated to at least one of a plurality of divided zones of at least one superframe, designating a reference location for MAS allocation to divided zones out of the plurality of divided zones of the superframe based on the calculated number of medium access slots, and allocating the medium access slots to the divided zones based on the designated reference location. Accordingly, more uniform service intervals can be supported, and thus efficient MAS resource allocation can be performed to satisfy media access control (MAC) based QoS requirements.

19 Claims, 5 Drawing Sheets

U.S. PATENT DOCUMENTS

| | | | |
|---|---|---|---|
| 2009/0041050 A1* | 2/2009 | Hunzinger | 370/447 |
| 2009/0154410 A1* | 6/2009 | Jeon et al. | 370/329 |
| 2009/0156207 A1* | 6/2009 | Prakash | 455/434 |

FOREIGN PATENT DOCUMENTS

| | | |
|---|---|---|
| KR | 10-2004-0102956 | 12/2004 |
| KR | 10-2005-0104294 | 11/2005 |
| KR | 10-2006-0047702 | 5/2006 |
| KR | 10-2006-0069141 | 6/2006 |
| KR | 10-2006-0102895 | 9/2006 |
| KR | 10-2006-0131859 A | 12/2006 |
| KR | 10-0776794 | 11/2007 |
| KR | 10-2007-0117572 | 12/2007 |
| KR | 10-2007-0118649 | 12/2007 |
| KR | 10-2008-0050961 A | 6/2008 |
| WO | WO 01/89153 | 11/2001 |
| WO | WO 2006061807 A1 | 6/2006 |

OTHER PUBLICATIONS

U.S. Office Action mailed Feb. 16, 2011, issued in the file history of U.S. Appl. No. 11/952,195.

U.S. Final Office Action mailed Aug. 15, 2011, issued in the file history of U.S. Appl. No. 11/952,195.

* cited by examiner

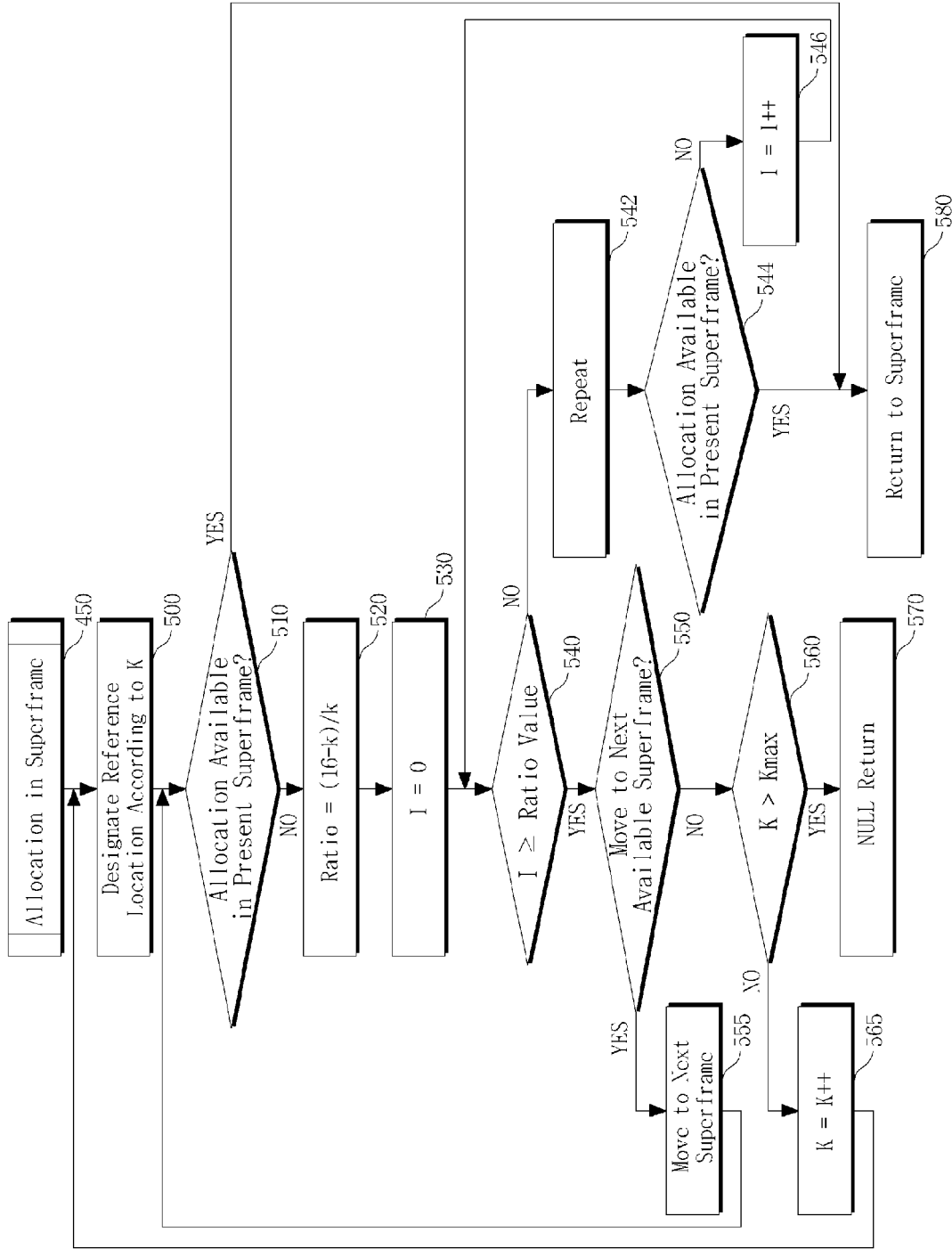

METHOD AND APPARATUS FOR ALLOCATING WIRELESS RESOURCE AND WIRELESS NETWORK SYSTEM

CROSS REFERENCE TO RELATED APPLICATION

This application claims the benefit under 35 U.S.C. §119 (a) of Korean Patent Application No. 10-2008-103643, filed on Oct. 22, 2008, the disclosure of which is incorporated herein in its entirety by reference.

BACKGROUND

1. Field

The following description relates to a network resource allocation technique, and more particularly, to a resource allocation apparatus and method which maintains quality of service (QoS) in a wireless communication network.

2. Description of the Related Art

WiMedia logical link control protocol (WLP) for a wireless network provides a service interval based medium access slot allocation (SIMA) technique for reliable quality of service (QoS) in a time division multiple access (TDMA)-based system employing distributed reservation protocol (DRP).

SIMA technique uses a traffic specification (TSPEC) of an application to obtain the maximum allowable values of a service rate and a delay time and cyclically performs medium access slot (MAS) allocation to satisfy delay bound.

For efficient MAS allocation, an iso-zone based SIMA scheme has been introduced which organizes a superframe into a plurality of allocation zones, organizes the allocation zones into iso-zones, each of which has an index value, and allocates medium access slots (MAS) to k number of iso-zones. However, the SIMA scheme has a drawback in that service intervals may not be uniform during MAS allocation depending on the number of iso-zones k. Furthermore, even if the superframe contains sufficient idle MAS for satisfying QoS required by a higher TSPEC, since the iso-zone based SIMA scheme cannot allocate further MAS, then there are limits to the efficient resource allocation management that can be obtained.

SUMMARY

Accordingly, in one aspect, there is provided a wireless resource allocation apparatus and method which makes service intervals more uniform during medium access slot (MAS) allocation to satisfy a traffic delay requirement and thereby improves required quality of service (QoS).

Also, there is provided a wireless resource allocation apparatus and method which increases distribution rate of MAS for minimizing idle MAS and thereby improves efficiency of resource distribution.

According to an aspect, there is provided a wireless resource allocation method in a wireless network, including calculating the number of medium access slots (MAS) to be allocated to at least one of a plurality of divided zones of at least one superframe, designating a reference location for MAS allocation to divided zones from the plurality of divided zones of the superframe based on the obtained number of medium access slots, and allocating the medium access slots to the divided zones based on information of designated reference location.

The designating of the reference location may designate the reference location such that an interval between the divided zones to which the medium access slots are to be allocated is minimized.

The calculating of the number of medium access slots may include calculating the amount of data included in a unit superframe based on service rate information, identifying the number of superframes based on the calculated amount of data, calculating a total channel time using the identified number of superframes, and calculating the number of medium access slots by dividing the total channel time by a time allocated to the medium access slots.

According to another aspect, there is provided a wireless resource allocation apparatus in a wireless network system, including a medium access slot (MAS) number calculating unit to calculate medium access slots to be allocated to at least one of a plurality of divided zones of at least one superframe, and a MAS allocating unit to designate a reference location for MAS allocation to divided zones among the plurality of divided zones of the superframe based on the calculated number of medium access slots and to perform the MAS allocation.

The MAS allocating unit may designate the reference location based on the calculated number of medium access slots such that an interval between the divided zones to which the medium access slots are to be allocated is minimized.

The MAS number calculating unit may include a data amount calculating unit to calculate the amount of data included in a unit superframe based on service rate information, a frame number identifying unit to identify the number of superframes based on the calculated amount of data, a time calculating unit to calculate a total channel time using the identified number of superframes, and a slot calculating unit to calculate the number of medium access slots by dividing the calculated total channel time by a time allocated to the medium access slots.

The MAS allocating unit may calculate the number of medium access slots to be allocated to a divided zone at the reference location and compares the calculated number of medium access slots to an allowable maximum number of medium access slots to be allocated to a divided zone of the superframe, and perform MAS allocation to another divided zone adjacent to the divided zone at the reference location when the calculated number of medium access slots is greater than the maximum number of medium access slots.

According to still another aspect, there is provided a wireless network system including a media access control (MAC) hierarchy control unit to calculate the number of medium access slots to be allocated to one of a plurality of divided zones of at least one superframe, to designate a reference location for MAC allocation to divided zones among the plurality of divided zones of the superframe based on the calculated number of medium access slots and to perform the MAC allocation.

The MAC hierarchy control unit may designate the reference location based on the calculated number of medium access slots such that an interval between the divided zones to which the medium access slots are to be allocated is minimized.

The MAC hierarchy control unit may calculate the number of medium access slots to be allocated to a divided zone at the reference location and compares the calculated number of medium access slots to an allowable maximum number of medium access slots to be allocated to a divided zone of the superframe, and perform MAS allocation to another divided zone adjacent to the divided zone at the reference location when the calculated number of medium access slots is greater than the maximum number of medium access slots.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 5 is a flowchart illustrating in detail an exemplary method of allocating medium access slots in a superframe.

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
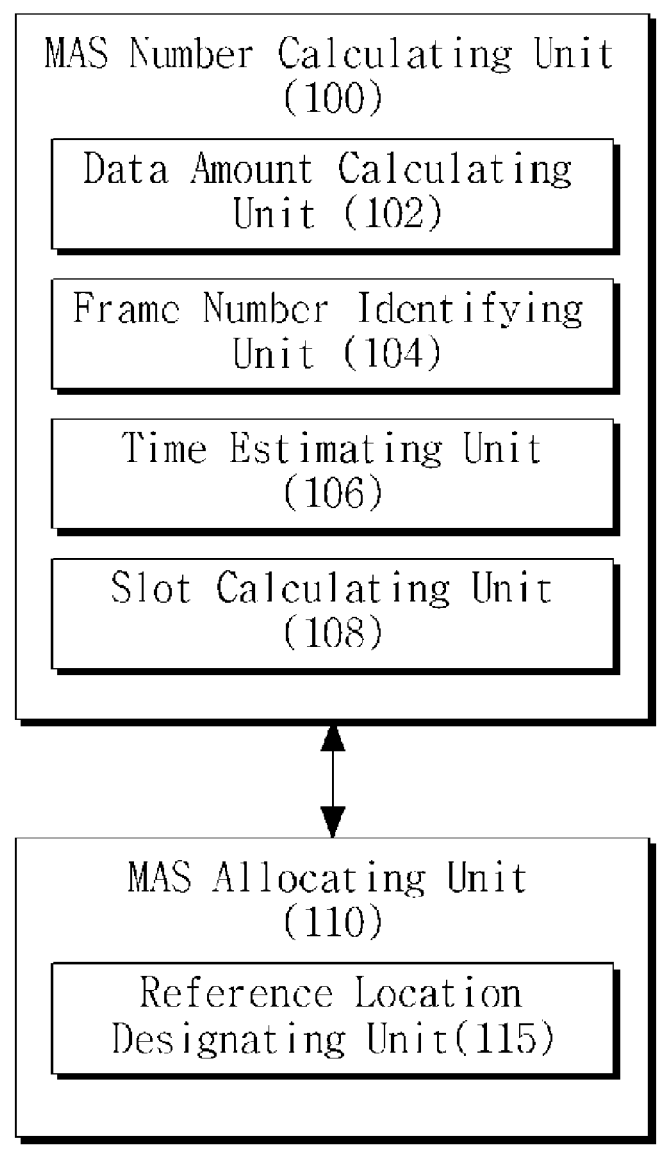
FIG. 1 is a block diagram illustrating an exemplary wireless resource allocation apparatus.

FIG. 1 is a block diagram illustrating an exemplary wireless resource allocation apparatus. The apparatus includes a medium access slot (MAS) number calculating unit 100 and a medium access slot (MAS) allocating unit 110.

The MAS number calculating unit 100 calculates the number of medium access slots (MAS) allocated to one of a plurality of divided zones of a superframe.

The superframe is composed of time slots, i.e., the medium access slots (MASs), and is divided into a beacon zone and a data zone. MASs belonging to the beacon zone are utilized for beacon transmission of individual devices, and each MAS includes an information element field that performs negotiation for MAS allocation. In addition, MASs belonging to the data period include a command frame that performs negotiation for MAS allocation. The MAS number calculating unit 100 calculates the number of medium access slots to be included in the data period of the superframe.

To calculate the number of medium access slots to be allocated per superframe, the MAS number calculating unit 100 may consider at least one of a medium variable of traffic specification (TSPEC) for an application stream, a service rate, a physical speed of a corresponding ultra wide band (UWB), a preamble mode, an answer mode, and the size of a media access control (MAC) service data unit (MSDU).

More specifically, the MAS number calculating unit 100 includes a data amount calculating unit 102, a frame number identifying unit 104, a time estimating unit 106, and a slot calculating unit 108.

In one example, the MAS number calculating unit 100 should consider a service rate and an overhead for frame transmission to obtain the number of medium access slots to be allocated per superframe. A service rate is requested by a higher hierarchy. Since the service rate is data traffic throughput obtained without considering the overhead generated in actual data transmission, a traffic throughput higher than the service rate is required for practical communications between devices. In other words, to calculate the number of medium access slots per superframe for communications between devices, both the service rate and the overhead caused by a transmitted packet data unit (PDU) need to be considered.

The data amount calculating unit 102 first obtains the service rate from the TSPEC, and then calculates the total amount of data to be transmitted to a unit superframe for satisfying the service rate with respect to device application.

The frame number identifying unit 104 obtains the number of superframes by dividing the amount of data which has been obtained by the data calculating unit 102 by a MAC service data unit of a given size corresponding to the payload of a superframe.

The time estimating unit 106 first estimates a channel time based on the number of superframes obtained by the frame number identifying unit 104, in consideration of an answer mode, a preamble mode, and the physical speed of a corresponding UWB. Subsequently, the time estimating unit 106 obtains the final total channel time by adding a request-to-send (RTS)/clear-to-send (CTS) and a guard time to the firstly estimated channel time. RTS/CTS is the minimum size of a packet of a CTS signal issued by a recipient to respond to an RTS signal.

The slot calculating unit 108 divides the obtained total channel time by the time allocated to a medium access slot to obtain the number of medium access slots.

The MAS allocating unit 110 designates a reference location for MAS allocation to divided zones among the plurality of divided zones of the superframe, based on the number of medium access slots calculated by the MAS number calculating unit 100. Then, the MAS allocating unit 110 allocates medium access slots to the divided zones based on the reference location. The MAS allocating unit 110 allocates as many MASs as the calculated number to the divided zones of the superframe. Here, the MAS allocating unit 110 includes a reference location designating unit 115 for medium access slots to be evenly distributed in the superframe.

The reference location designating unit 115 identifies the number of divided zones to which medium access slots are allocated, according to the number of the medium access slots. The number of divided zones may be calculated in consideration of a service interval for satisfying a traffic delay requirement in accordance with the traffic specification. The reference location may be designated for the divided zones to which the medium access slots are to be allocated such that intervals between neighboring divided zones to which the medium access slots are to be allocated can be minimized.

Additionally, the MAS allocating unit 110 compares the calculated number of medium access slots by the MAS number calculating unit 100 to the maximum number of medium access slots which one divided zone of the superframe can accommodate. When the calculated number of medium access slots is greater than the allowable maximum number of medium access slots, the MAS allocating unit 110 allocates the medium access slots to a neighboring divided zone.

Figure 2:
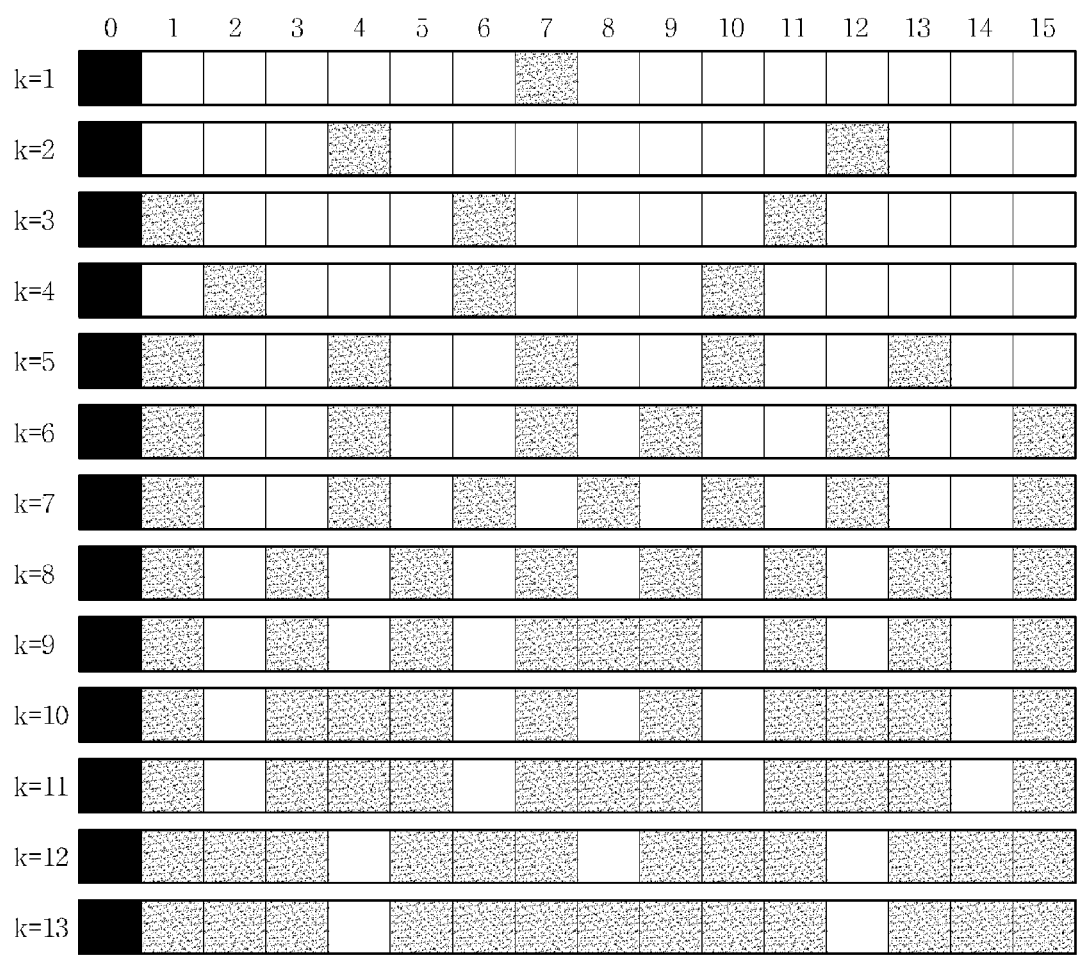
FIG. 2 is a diagram illustrating examples of a reference location designated based on the number of medium access slots to be allocated to a divided zone.

FIG. 2 is a diagram illustrating examples of a reference location according to the number of medium access slots to be allocated to a divided zone.

In the conventional service interval based MAS allocation (SIMA) method, the order of use of the reference location is based on the priority of an iso-zone which is the divided zone to which MAS is to be allocated. In this conventional method, it is problematic that intervals between the divided zones are not equal to one another. When the intervals between the divided zones are not uniform, a service interval between each divided zone is lengthened. Therefore, for services requiring a short service interval, the allocation failure probability can consequently increase in a medium shared by service devices. To evenly distribute reservation zones according to strict service interval restrictions, as shown in FIG. 2, the reference location may be designated for the divided zones to which medium access slots participating in the reservation are to be allocated.

In FIG. 2, the number k of divided zones to which MASs are to be allocated is increased in rows. Individual columns indicate divided zones, some of which MASs are to be allocated to.

Since the zone 0 is a reserved for a beacon message, the superframe may be divided into 15 zones. For example, when k which is the number of divided zones to which medium access slots are to be allocated is 3, medium access slots may be allocated to zones 1, 6, and 11. Where a divided zone has a service interval of 4,096 μs, a service interval can be at maximum 6*4,096 μs, and thus intervals between medium access slots allocated in the superframe, i.e. a difference between the maximum service interval and the minimum service interval can be minimized.

Figure 3:
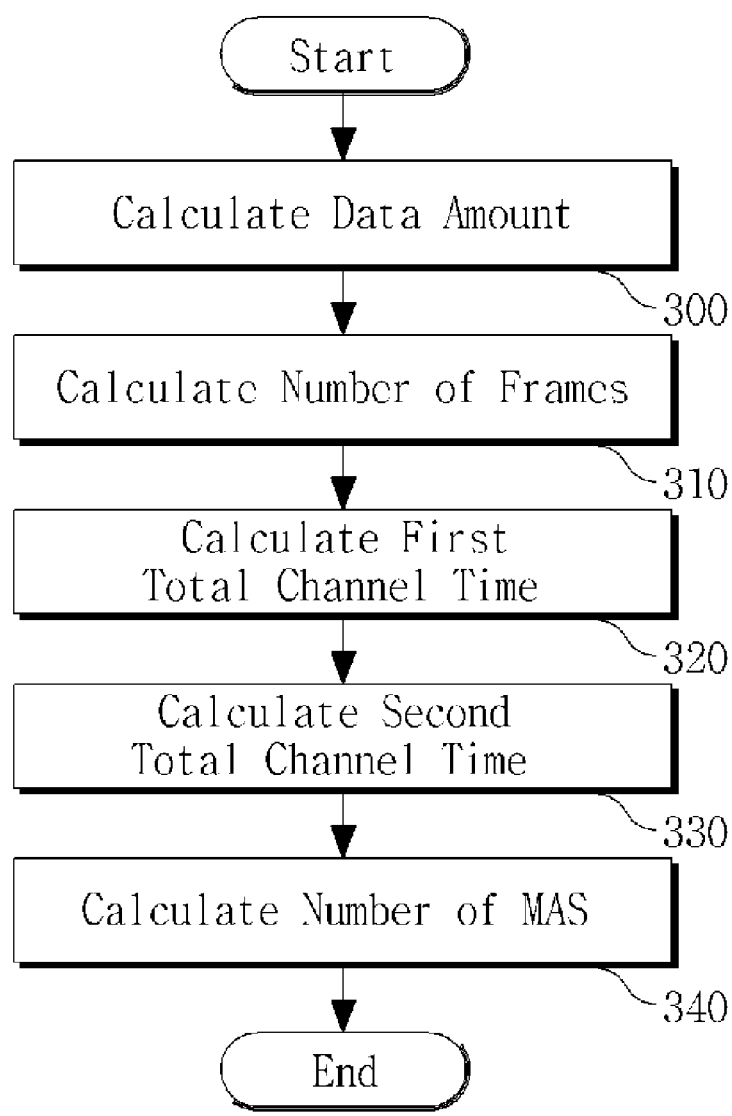
FIG. 3 is a flowchart illustrating an exemplary method of calculating the number of medium access slots.

FIG. 3 is a flowchart illustrating an exemplary method of calculating the number of medium access slots.

First, a service rate is obtained from TSPEC. Then, the total amount of data to be transmitted to a unit superframe for satisfying the service rate with respect to device application is calculated (operation 300). The data to be transmitted to the unit superframe is divided by MSDU of a predetermined size corresponding to the payload of a superframe, and consequently the number of superframes is obtained (operation 310).

The total channel time is primarily calculated based on the number of superframes, in consideration of an answer mode, a preamble mode, and a physical speed of a corresponding UWB (operation 320). Then, a final total channel time is calculated by adding a guard time and RTS/CTS, which is the minimum packet size of a CTS signal from a recipient to respond to a RTS signal, to the primarily calculated total channel time (operation 330).

The final total channel time is divided by the time allocated to each MAS so as to output the number of medium access slots to be allocated in the superframe (operation 340).

Figure 4:
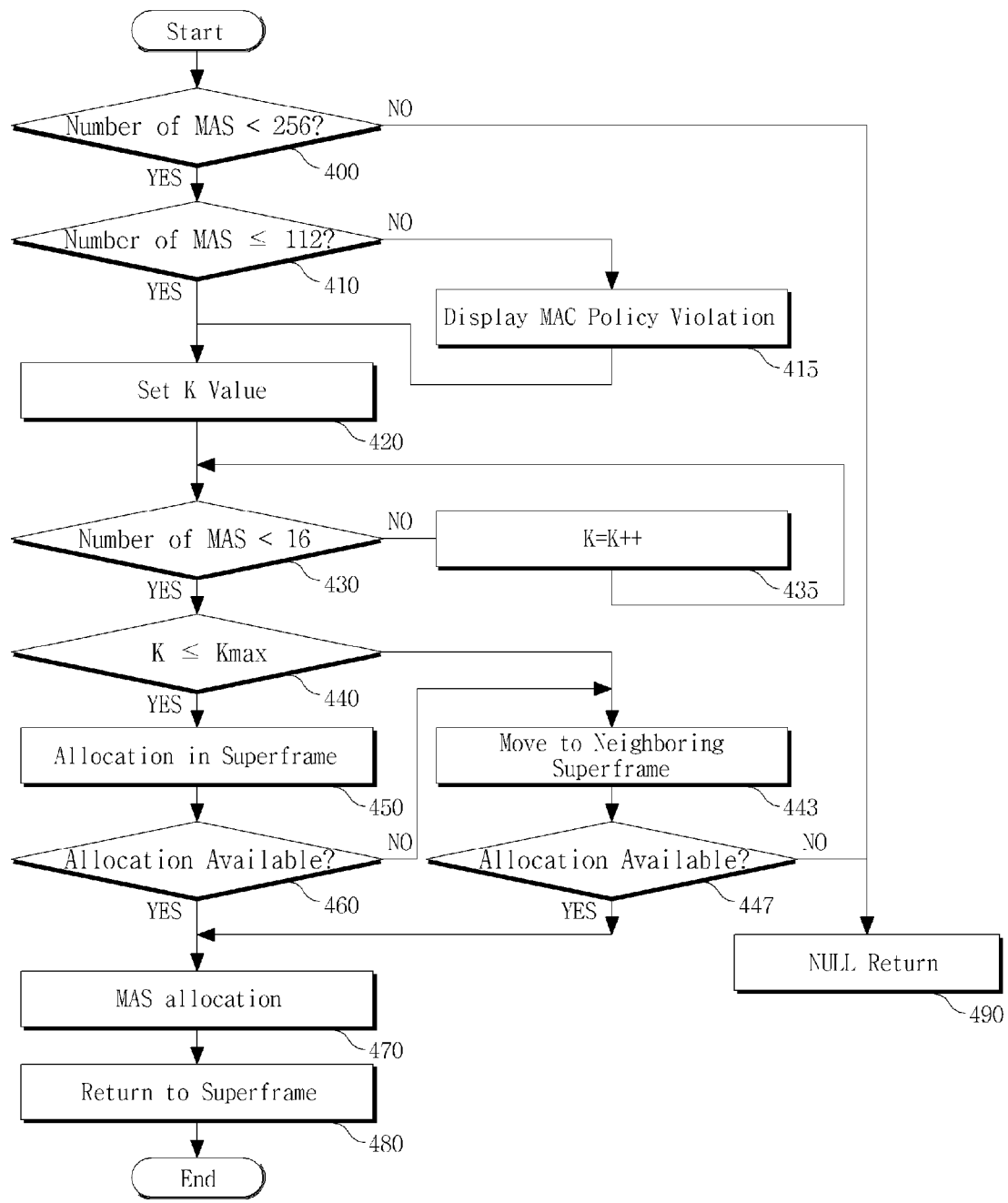
FIG. 4 is a flowchart illustrating an exemplary method of allocating medium access slots.

FIG. 4 is a flowchart illustrating an exemplary method of allocating medium access slots.

It is determined whether or not the calculated number of medium access slots is smaller than the maximum number of medium access slots that can be contained in a unit superframe (operation 400). In one example, the maximum number of medium access slots that can be contained in a superframe may be 16*16, i.e. 256.

If the calculated number of medium access slots is smaller than the maximum number of medium access slots that can be contained, the calculated number is compared to a threshold value predetermined by MAC policy (operation 410). When the calculated number of medium access slots is greater than the predetermined threshold value, a safe value of the superframe becomes false. This indicates that the number of medium access slots to be allocated in a superframe violates the MAC policy (operation 415). On the other hand, if the calculated number of medium access slots is smaller than or equal to the threshold value predetermined by the MAC policy, the number of divided zones to which medium access slots are to be allocated, that is k, is set in consideration of a service interval (operation 420).

In one example, where the number of medium access slots which one divided zone can contain is 16, if the number of medium access slots to be allocated to the divided zone is more than 16, all medium access slots cannot be allocated to the divided zone. Hence, when the number of medium access slots to be allocated is more than 16 (operation 430), more divided zones to which the medium access slots are to be allocated are required (operation 435). That is, when the number of medium access slots to be allocated is more than 16, k increases by 1.

In addition, when the number of medium access slots to be allocated is less than 16, k is compared to the maximum number, i.e. $k_{max}$, of divided zones to which medium access slots are to be allocated in the superframe (operation 440).

When k is smaller than or equal to $k_{max}$, the medium access slots are allocated in the superframe (operation 450). At this time, it is determined whether a divided zone to which medium access slots are to be allocated is available for allocation (operation 460), and if the divided zone is available, the medium access slots are allocated thereto (operation 470). Then, allocation of medium access slots to the next available divided zone is performed in the same superframe to which the medium access slots have been allocated (operation 480).

Alternatively, if k is greater than $k_{max}$, there is no divided zone to which medium access slots can be allocated in the superframe. Thus, a shift to a neighboring superframe for allocation takes place (operation 443). When the allocation is available in the neighboring superframe (operation 447), medium access slots are allocated thereto (operation 470). The allocation process returns to the superframe to which the medium access slots are allocated in operation 470 (operation 480). Alternatively, if the neighboring superframe is not available for the allocation, a null value is returned.

FIG. 5 is a flowchart illustrating in detail an exemplary method of allocating medium access slots in a superframe. The MAS allocation is conducted based on cyclic and uniform distribution. First, based on the number, i.e. k, of divided zones to which medium access slots are to be allocated out of a plurality of divided zones in a superframe, a reference location of the divided zones to which the medium access slots are to be allocated is identified (operation 500). The designating of the reference location based on k is described above with reference to FIG. 2.

Based on information on the designated reference location, it is determined whether or not all medium access slots can be allocated in the present superframe (operation 510). If the allocation is available, the medium access slots are allocated in the superframe, and an allocation location returns to the reference location of the superframe (580). On the other hand, when all medium access slots cannot be allocated in the present superframe, it is determined whether a neighboring superframe is available for allocation of medium access slots.

For example, it is assumed that a superframe is divided into sixteen zones and a ratio between the number of zones to which medium access slots are to be allocated and the remaining zones is calculated (operation 520). That is, the ratio can be obtained by (16-k)/k. An initial value of an arbitrary number I is set as 0 (operation 530), and the value of I is compared to the calculated ratio value (operation 540).

The comparison is performed repeatedly until the value of I reaches the ratio value (operation 542), and it is determined whether the superframe is available for the MAS allocation (operation 544). When it is determined that the superframe is available, the MAS allocation is performed on the divided zones to which the medium access slots are to be allocated in the superframe (operation 580). Alternatively, if the superframe is not available, a value of I is increased by 1 (operation 546).

If the value of I is equal to or greater than the ratio value, this implies that the MAS allocation cannot be performed on a next divided zone in the same superframe any longer, and it is determined whether it is possible to proceed with the MAS allocation in another superframe (operation 550). If the MAS allocation is possible, a shift from the present superframe to the next superframe is performed (operation 555). When the superframe shift is not possible and k is smaller than the maximum number of the divided zones in the superframe, i.e., $k_{max}$ (operation 560), k is increased by 1 (operation 565) and the process returns to operation 500. When k is greater than $k_{max}$, a null value is returned.

In a wireless network system including a plurality of devices, each device transmits a beacon included in a beacon zone of a superframe to adjacent devices prior to data transmission. The beacon zone of each device contains a device identifier, beacon slot information, medium use history, and the like. The devices reserve different divided zones to which medium access slots are to be allocated, and receives corresponding medium access slots.

A media access control (MAC) hierarchy of the wireless network system obtains the number of medium access slots to be allocated to one divided zone out of a plurality of divided zones of a superframe, designates a reference location for MAS allocation in the superframe based on the obtained number of medium access slots, and performs the MAS allocation.

In this case, the MAC hierarchy identifies the number of divided zones to which medium access slots are to be allocated in the superframe based on the obtained number of medium access slots. Then, a reference location for the divided zones to which medium access slots are to be allocated is designated such that the intervals between the divided zones to which medium access slots are to be allocated can be minimized.

Also, the MAC hierarchy obtains the number of medium access slots to be allocated to a divided zone at the reference location and compares the obtained number of medium access slots to the allowable maximum number of medium access slots to be allocated in a divided zone of the superframe. If the comparison result shows that the obtained number of medium access slots is greater than the maximum number of medium access slots, the MAC hierarchy performs MAS allocation on another divided zone adjacent to the divided zone at the reference location.

As described above, media resource slots are cyclically allocated at uniform intervals for efficient use of medium resource in a wireless network system, so that more uniform service intervals can be formed. Consequently, efficient MAC allocation is possible, satisfying MAC-based quality of service (QoS) requirements.

In addition, the distribution rate of MASs can be increased to minimize the number of idle MASs.

The wireless resource allocation method described above can be implemented as a computer program. Also, the method may be recorded, stored, or fixed in one or more computer-readable media that includes program instructions to be implemented by a computer to cause a processor to execute or perform the program instructions. Examples of computer-readable media include magnetic media and optical media.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless resource allocation method in a wireless network, comprising:
    calculating the number of medium access slots (MAS) to be allocated to at least one of a plurality of divided zones of at least one superframe based on at least on of a medium variable of traffic specification (TSPEC) for an application stream, a service rate, a physical speed of a corresponding ultra wide band (UWB), a preamble mode, an answer mode, and the size of a media access control (MAC) service data unit (MSDU);
    designating a reference location for MAS allocation to divided zones from the plurality of divided zones of the superframe based on the obtained number of medium access slots; and
    allocating the medium access slots to the divided zones based on information of designated reference location.

2. The wireless resource allocation method of claim 1, wherein the designating of the reference location designates the reference location such that an interval between the divided zones to which the medium access slots are to be allocated is minimized.

3. The wireless resource allocation method of claim 1, wherein the designating of the reference location comprises:
    identifying the number of divided zones to which the medium access slots are to be allocated in the superframe based on the calculated number of medium access slots; and
    designating the reference location based on the identified number of divided zones.

4. The wireless resource allocation method of claim 3, wherein the identifying of the number of divided zones takes into consideration a service interval for satisfying a traffic delay requirement in accordance with traffic specification (TSPEC).

5. The wireless resource allocation method of claim 3, wherein the identifying of the number of divided zones comprises, when traffic specifications for an application stream are not defined, monitoring traffic in real time, estimating traffic specifications and a traffic delay requirement based on a monitoring result and identifying the number of divided zones in consideration of the service interval for satisfying the estimated traffic delay requirement.

6. The wireless resource allocation method of claim 3, further comprising:
    calculating the number of medium access slots to be allocated to a divided zone at the reference location and comparing the calculated number of medium access slots to an allowable maximum number of medium access slots to be allocated to a divided zone of the superframe,
        wherein when the calculated number of medium access slots is greater than the maximum number of medium access slots, the medium access slots are allocated to another divided zone adjacent to the divided zone at the reference location.

7. The wireless resource allocation method of claim 3, further comprising:
    determining whether or not it is possible to allocate all medium access slots to the divided zone at the reference location among the plurality of divided zones of the superframe; and
    varying the number of divided zones to which the medium access slots are to be allocated according to the result of the determination.

8. A wireless resource allocation method in a wireless network, comprising:

calculating the number of medium access slots (MAS) to be allocated to at least one of a plurality of divided zones of at least one superframe;

designating a reference location for MAS allocation to divided zones from the plurality of divided zones of the superframe based on the obtained number of medium access slots; and allocating the medium access slots to the divided zones based on information of designated reference location, wherein the calculating of the number of medium access slots comprises:

calculating the amount of data included in a unit superframe based on service rate information;

identifying the number of superframes based on the calculated amount of data;

calculating a total channel time using the identified number of superframes; and calculating the number of medium access slots by dividing the total channel time by a time allocated to the medium access slots.

9. The wireless resource allocation method of claim 8, wherein the calculating of the total channel time takes into consideration at least one of an answer mode, a preamble mode, and a physical speed of a corresponding ultra wide band (UWB).

10. The wireless resource allocation method of claim 9, wherein the calculating of the total channel time further takes into consideration the number of reserved divided zones and guard time.

11. The wireless resource allocation method of claim 8, wherein the identifying of the number of superframes comprises dividing the calculated amount of data by a media access control service data unit of a predetermined size which is designated for a payload of the unit superframe.

12. A wireless resource allocation method in a wireless network, comprising:

calculating the number of medium access slots (MAS) to be allocated to at least one of a plurality of divided zones of at least one superframe;

designating a reference location for MAS allocation to divided zones from the plurality of divided zones of the superframe based on the obtained number of medium access slots;

allocating the medium access slots to the divided zones based on information of designated reference location;

comparing the calculated number of medium access slots to a threshold value defined by a media access control (MAC) policy; and when the comparison result shows that the calculated number of medium access slots is greater than the threshold value, displaying a violation of the MAC policy.

13. A wireless resource allocation apparatus in a wireless network system, comprising:

a medium access slot (MAS) number calculating unit to calculate medium access slots to be allocated to at least one of a plurality of divided zones of at least one superframe based on at least on of a medium variable of traffic specification (TSPEC) for an application stream, a service rate, a physical speed of a corresponding ultra wide band (UWB), a preamble mode, an answer mode, and the size of a media access control (MAC) service data unit (MSDU); and a MAS allocating unit to designate a reference location for MAS allocation to divided zones among the plurality of divided zones of the superframe based on the calculated number of medium access slots and to perform the MAS allocation.

14. The wireless resource allocation apparatus of claim 13, wherein the MAS allocating unit designates the reference location based on the calculated number of medium access slots such that an interval between the divided zones to which the medium access slots are to be allocated is minimized.

15. A wireless resource allocation apparatus in a wireless network system, comprising:

a medium access slot (MAS) number calculating unit to calculate medium access slots to be allocated to at least one of a plurality of divided zones of at least one superframe; and a MAS allocating unit to designate a reference location for MAS allocation to divided zones among the plurality of divided zones of the superframe based on the calculated number of medium access slots and to perform the MAS allocation, wherein the MAS number calculating unit comprises:

a data amount calculating unit to calculate the amount of data included in a unit superframe based on service rate information;

a frame number identifying unit to identify the number of superframes based on the calculated amount of data;

a time calculating unit to calculate a total channel time using the identified number of superframes; and a slot calculating unit to calculate the number of medium access slots by dividing the calculated total channel time by a time allocated to the medium access slots.

16. A wireless resource allocation apparatus in a wireless network system, comprising:

a medium access slot (MAS) number calculating unit to calculate medium access slots to be allocated to at least one of a plurality of divided zones of at least one superframe; and a MAS allocating unit to designate a reference location for MAS allocation to divided zones among the plurality of divided zones of the superframe based on the calculated number of medium access slots and to perform the MAS allocation, wherein the MAS allocating unit calculates the number of medium access slots to be allocated to a divided zone at the reference location and compares the calculated number of medium access slots to an allowable maximum number of medium access slots to be allocated to a divided zone of the superframe, and performs MAS allocation to another divided zone adjacent to the divided zone at the reference location when the calculated number of medium access slots is greater than the maximum number of medium access slots.

17. A wireless network system comprising:

a media access control (MAC) hierarchy control unit to calculate the number of medium access slots to be allocated to one of a plurality of divided zones of at least one superframe based on at least on of a medium variable of traffic specification (TSPEC) for an application stream, a service rate, a physical speed of a corresponding ultra wide band (UWB), a preamble mode, an answer mode, and the size of a media access control (MAC) service data unit (MSDU), to designate a reference location for MAC allocation to divided zones among the plurality of divided zones of the superframe based on the calculated number of medium access slots, and to perform the MAC allocation.

18. The wireless network system of claim 17, wherein the MAC hierarchy control unit designates the reference location based on the calculated number of medium access slots such that an interval between the divided zones to which the medium access slots are to be allocated is minimized.

19. A wireless network system comprising:
a media access control (MAC) hierarchy control unit to calculate the number of medium access slots to be allocated to one of a plurality of divided zones of at least one superframe, to designate a reference location for MAC allocation to divided zones among the plurality of divided zones of the superframe based on the calculated number of medium access slots, and to perform the MAC allocation,
wherein the MAC hierarchy control unit calculates the number of medium access slots to be allocated to a divided zone at the reference location and compares the calculated number of medium access slots to an allowable maximum number of medium access slots to be allocated to a divided zone of the superframe, and performs MAS allocation to another divided zone adjacent to the divided zone at the reference location when the calculated number of medium access slots is greater than the maximum number of medium access slots.

* * * * *